(12) United States Patent
Heikkinen et al.

(10) Patent No.: US 10,557,500 B2
(45) Date of Patent: Feb. 11, 2020

(54) ROTOR ASSEMBLY FOR AN AXIAL MAGNETIC BEARING

(71) Applicant: Lappeenrannan-Lahden teknillinen yliopisto LUT, Lappeenranta (FI)

(72) Inventors: Janne Heikkinen, Lappeenranta (FI); Jussi Sopanen, Lappeenranta (FI)

(73) Assignee: Lappeenrannan-Lahden teknillinen yliopisto LUT, Lappeenranta (FI)

( * ) Notice: Subject to any disclaimer, the term of this patent is extended or adjusted under 35 U.S.C. 154(b) by 156 days.

(21) Appl. No.: 15/545,137

(22) PCT Filed: Dec. 3, 2015

(86) PCT No.: PCT/FI2015/050850
§ 371 (c)(1),
(2) Date: Jul. 20, 2017

(87) PCT Pub. No.: WO2016/116660
PCT Pub. Date: Jul. 28, 2016

(65) Prior Publication Data
US 2018/0017105 A1    Jan. 18, 2018

(30) Foreign Application Priority Data
Jan. 21, 2015   (FI) ..................... 20155048

(51) Int. Cl.
*H02K 7/09* (2006.01)
*F16C 32/04* (2006.01)

(52) U.S. Cl.
CPC ........ *F16C 32/0476* (2013.01); *F16C 32/047* (2013.01); *F16C 32/0468* (2013.01)

(58) Field of Classification Search
CPC .... F16C 32/04; F16C 32/0468; F16C 32/047; F16C 32/0476; F16C 17/00; F16C 17/02;
(Continued)

(56) References Cited

U.S. PATENT DOCUMENTS

| 5,496,124 A | 3/1996 | Bareis et al. |
| 5,739,607 A | 4/1998 | Wood, III |

(Continued)

FOREIGN PATENT DOCUMENTS

| CN | 102449267 | 5/2012 |
| DE | 499 929 C | 6/1930 |

(Continued)

OTHER PUBLICATIONS

DE 499929, all pages (Year: 1930).*
(Continued)

*Primary Examiner* — Naishadh N Desai
(74) *Attorney, Agent, or Firm* — Young & Thompson

(57) ABSTRACT

A rotor assembly for an axial magnetic bearing includes a shaft portion and a disc attached to the shaft portion. The disc includes a conical surface on a portion reaching radially from the aperture of the disc a distance away from the aperture. A fastening mechanism includes an aperture for the shaft portion so that the fastening mechanism includes a conical surface matching the conical surface of the disc. The fastening mechanism and the shaft portion are shaped to enable the fastening mechanism to be tightened axially against the conical surface of the disc so as to arrange the conical surface of the fastening mechanism to press the conical surface of the disc towards the center line of the shaft portion. Thus, the fastening mechanism acts against the centrifugal force and keeps the disc centric placed.

11 Claims, 2 Drawing Sheets

(58) Field of Classification Search
CPC .......... F16C 17/04; F16C 17/10; F16C 17/12; F16C 17/26; F16C 19/00; F16C 23/00; F16C 25/00; F16C 27/00; F16C 29/00; F16C 33/00; H02K 7/09
USPC ....................................................... 310/90.5
See application file for complete search history.

(56) References Cited

U.S. PATENT DOCUMENTS

| | | | | |
|---|---|---|---|---|
| 6,710,489 | B1* | 3/2004 | Gabrys | ................. H02K 7/025 310/74 |
| 2004/0022653 | A1* | 2/2004 | Brunet | ................ F16C 32/0442 417/423.5 |
| 2012/0014790 | A1* | 1/2012 | Zacharias | ............... F01D 5/066 415/229 |
| 2012/0038233 | A1* | 2/2012 | Funda | ................ F16C 32/0468 310/90.5 |
| 2012/0288370 | A1 | 11/2012 | Kuhn | |
| 2013/0328455 | A1 | 12/2013 | Wu | |
| 2014/0125176 | A1* | 5/2014 | Swann | ................... F16C 39/04 310/90.5 |

FOREIGN PATENT DOCUMENTS

| | | |
|---|---|---|
| DE | 10 2010 064215 A1 | 6/2012 |
| EP | 2 522 819 A2 | 11/2012 |
| FR | 1361776 A | 5/1964 |
| JP | H1137155 A | 2/1999 |

OTHER PUBLICATIONS

International Search Report dated Mar. 10, 2016, in corresponding PCT application.
Finnish Search Report dated Sep. 2, 2015 in corresponding Finland application.
Chinese Office Action for Application No. 201580074131.7, dated Sep. 29, 2018, with English translation provided.

* cited by examiner

ROTOR ASSEMBLY FOR AN AXIAL MAGNETIC BEARING

FIELD OF THE DISCLOSURE

The disclosure relates generally to magnetic levitation. More particularly, the disclosure relates to a rotor assembly comprising a shaft portion and a disc attached to the shaft portion and suitable for operating as a part of an axial magnetic bearing. Furthermore, the disclosure relates to an axial magnetic bearing.

BACKGROUND

Magnetic levitation systems, such as e.g. active magnetic bearings "AMB", are commonly known in the art. Magnetic levitation systems are commonly utilized for supporting a rotating or oscillating object. Using magnetic levitation in rotating machinery results in for example: reduction of friction, oil-free operation, lower maintenance costs, and/or higher reliability when compared to traditional rotating machines with mechanical bearings. In many cases, an axial magnetic bearing comprises a disc on a rotating shaft and controllable electromagnets for directing axial forces to the disc. Magnetic bearings are often used in high speed applications where the rotational speed introduces high centrifugal forces into the rotating components. High centrifugal forces tend to expand radially the above-mentioned disc and this may lead to a situation where the disc becomes loose on the shaft. This may further lead into a situation where the disc moves radially due to rotational speed and mass unbalance of the disc and, as a corollary, adverse mass unbalance into the rotating system as a whole may result in.

In many cases, the above-mentioned disc is attached to the shaft with a shrink fit. This approach is, however, not free from challenges. One of the challenges is related to the fact that the shrink fit requires a large difference in connecting diameters in a way that the shaft has a greater diameter than the aperture of the disc when the shaft and the disc are at a same temperature and the disc is not installed on the shaft. This is because the disc must not get loose on the shaft when the disc, and thereby the aperture of the disc, is expanded by the centrifugal force. In practice, this means that the deformation at also the highest rotational speed has to be smaller than the difference between the above-mentioned connecting diameters of the shaft and the disc. The large difference in the connecting diameters requires more thermal expansion from the disc in order to be able to install the disc on the shaft. The attachment method based on the shrink fit is expensive from both manufacturing and assembling viewpoints. Additionally, handling hot objectives is a safety issue, and also the possibility to a failure in assembling the heated disc is always present.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new rotor assembly suitable for an axial magnetic bearing. A rotor assembly according to the invention comprises:
 a shaft portion,
 a disc attached to the shaft portion and suitable for operating as a part of an axial magnetic bearing, the disc comprising an aperture for the shaft portion, and
 a fastening mechanism for attaching the disc to the shaft portion.

The disc comprises a conical surface on a portion reaching radially from the aperture of the disc a distance away from the aperture of the disc, and the fastening mechanism comprises an aperture for the shaft portion so that the fastening mechanism comprises a conical surface matching the conical surface of the disc. The fastening mechanism and the shaft portion are shaped to enable the fastening mechanism to be tightened axially against the conical surface of the disc so as to arrange the conical surface of the fastening mechanism to press the conical surface of the disc towards the center line of the shaft portion, the fastening mechanism directing axial force to the shaft when being tightened axially against the conical surface of the disc. Therefore, the fastening mechanism is arranged to act against the centrifugal force and thereby to keep the disc centric placed.

In accordance with the invention, there is provided also a new axial magnetic bearing comprising:
 a rotor assembly according to the invention,
 equipment for generating a position signal indicative of an axial position of the rotor assembly,
 at least one electromagnet for directing an axial force to the disc of the rotor assembly, and
 a controller for receiving the position signal and for controlling electrical current of the electromagnet on the basis of a deviation of the axial position of the rotor assembly from a reference axial position.

The axial magnetic bearing may comprise two electromagnets for directing mutually opposite axial forces to the disc. However, it is worth noting that the axial magnetic bearing may comprise only one electromagnet for supporting the rotor assembly against axial loading having a constant direction, e.g. against downwards directed loading including the gravity force. It is also possible that the axial magnetic bearing comprises, in addition to the electromagnet, a permanent magnet so that the electromagnet and the permanent magnet are arranged to direct mutually opposite axial forces to the disc.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

Figure 1A:
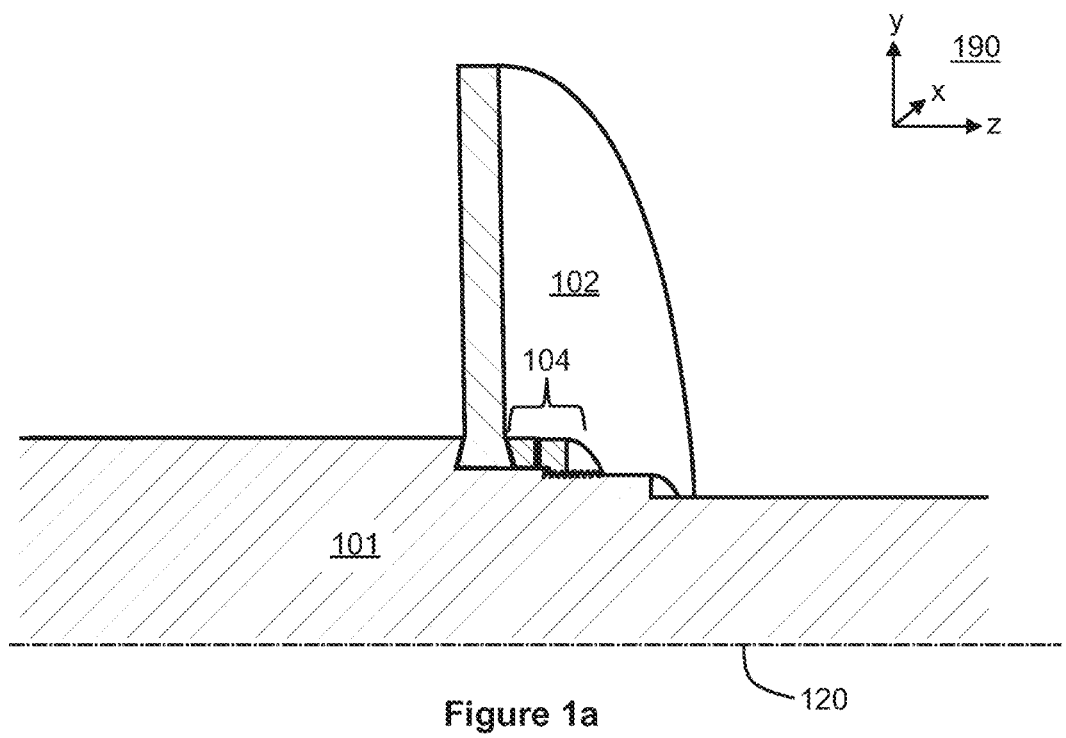
FIGS. 1a and 1b illustrate a rotor assembly according to an exemplifying and non-limiting embodiment of the invention, and FIG. 2 illustrate an axial magnetic bearing according to an exemplifying and non-limiting embodiment of the invention.
Figure 1B:
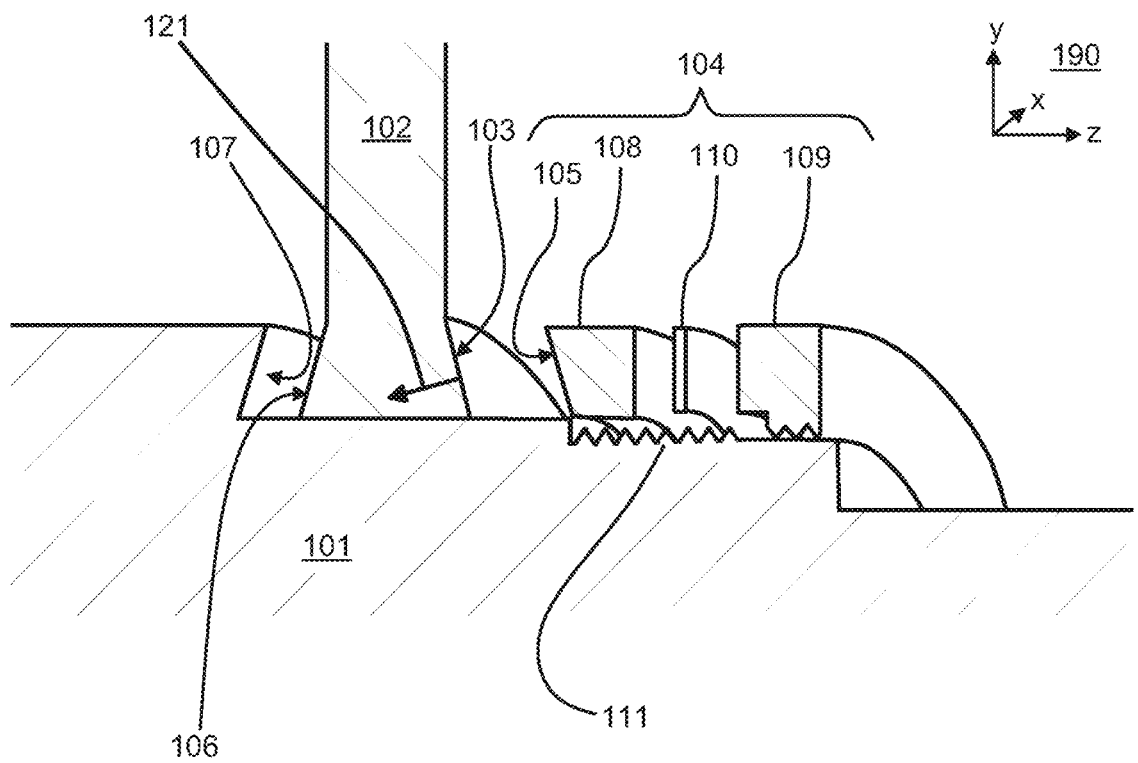

FIGS. 1a and 1b illustrate a rotor assembly according to an exemplifying and non-limiting embodiment of the invention. FIG. 1a shows a partial view of a section where the section plane is parallel with the yz-plane of a coordinate system 190. The rotor assembly comprises a shaft portion 101 that is substantially rotationally symmetric with respect to a center line 120. The rotor assembly comprises a disc 102 attached to the shaft portion and suitable for operating as a part of an axial magnetic bearing. The disc 102 can be made of e.g. steel or some other suitable ferromagnetic material. The disc comprises an aperture for the shaft portion 101. The rotor assembly comprises a fastening mechanism 104 for attaching the disc 102 to the shaft portion 102. The fastening mechanism 104 is illustrated in more details in FIG. 1b. For illustrative purposes, the elements of the fastening mechanism 104 are depicted as an exploded view in FIG. 1b. The disc 102 comprises a conical surface 103 on a portion reaching radially from the aperture of the disc a distance away from the aperture of the disc. The fastening mechanism comprises an aperture for the shaft portion 101 so that the fastening mechanism comprises a conical surface 105 matching the conical surface 103 of the disc 102. The fastening mechanism and the shaft portion are shaped to enable the fastening mechanism to be tightened axially against the conical surface 103 of the disc so as to arrange the conical surface 105 of the fastening mechanism to press the conical surface of the disc towards the center line 120 of the shaft portion. Force that can be directed to one point of the conical surface 103 of the disc is depicted with an arrow 121 in FIG. 1b. As can be understood on the basis of FIGS. 1a and 1b, the above-mentioned force has a radial component that is towards the center line 120. Therefore, the fastening mechanism 104 is able to act against the centrifugal force and thereby to keep the disc 102 centric placed.

In the exemplifying and non-limiting rotor assembly illustrated in FIGS. 1a and 1b, the disc 102 comprises two conical surfaces on opposite sides of the disc. The above-mentioned conical surface 103 is a first one of the two conical surfaces. The shaft portion is shaped to comprise a conical surface 107 that matches the second one 106 of the conical surfaces of the disc and presses the second one of the conical surfaces of the disc towards the center line 120 of the shaft portion when the fastening mechanism is tightened axially against the conical surface 103 of the disc. In this exemplifying and non-limiting case, radial force components capable of acting against the centrifugal force and keeping the disc 102 centric placed are directed to both sides of the disc.

In the exemplifying and non-limiting rotor assembly illustrated in FIGS. 1a and 1b, the fastening mechanism 104 comprises a first element 108 having the conical surface 105 of the fastening mechanism and a second element 109 for tightening the first element axially against the conical surface 103 of the disc. The second element 109 has threads matching the corresponding threads 111 of the shaft portion.

Thus, the second element 109 is actually a tightening nut. Furthermore, the fastening mechanism 104 may comprise a washer-plate 110 between the first and second elements 108 and 109. It is also possible that the first and second elements 108 and 109 constitute a single part in which case there is, of course, no washer-plate.

Figure 2:
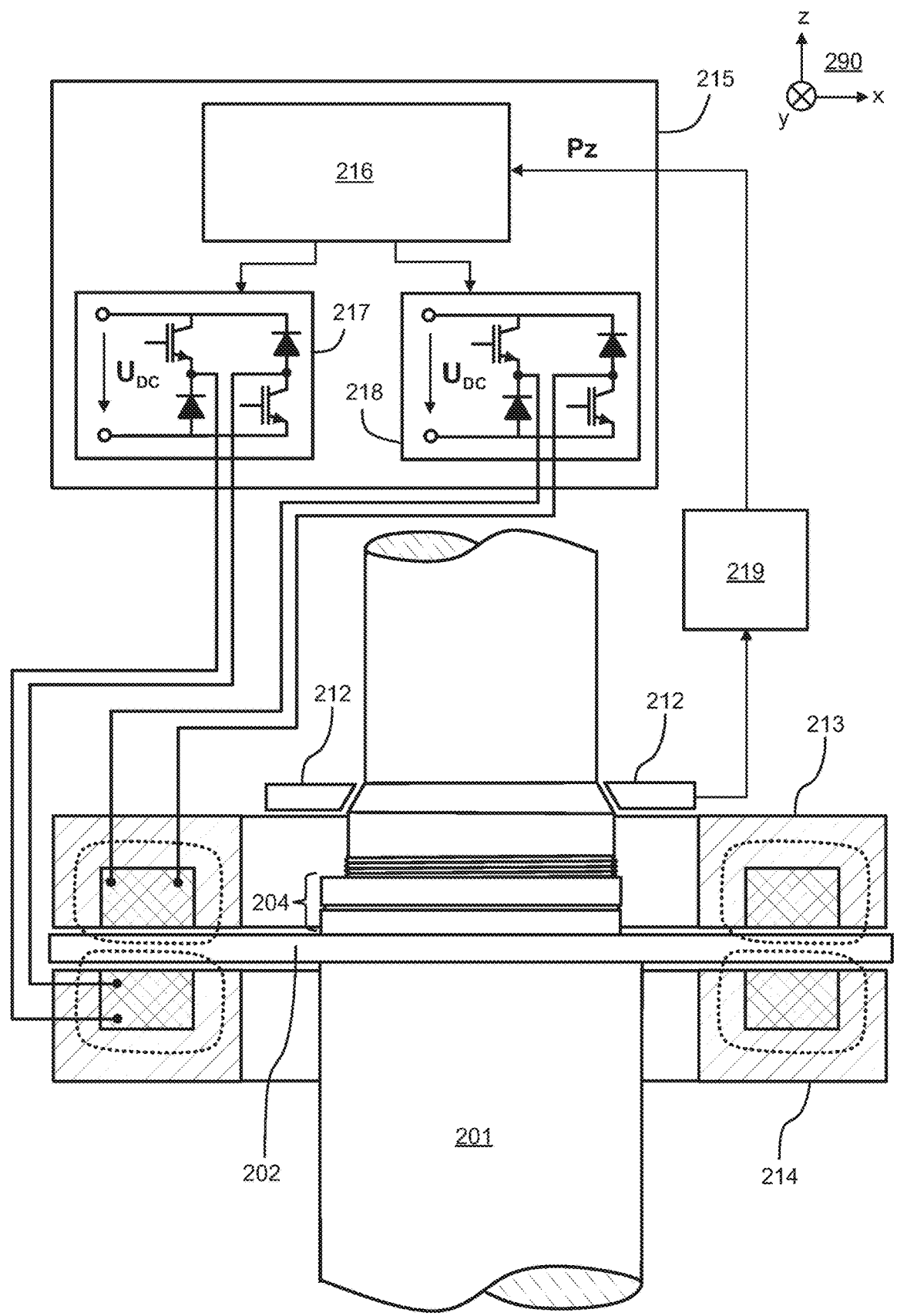

FIG. 2 illustrate an axial magnetic bearing according to an exemplifying and non-limiting embodiment of the invention. The axial direction is the z-direction of a coordinate system 290. The axial magnetic bearing comprises a rotor assembly that comprises a shaft portion 201, a disc 202, and a fastening mechanism 204 for attaching the disc to the shaft portion. The rotor assembly can be for example a rotor of an electrical machine where the axis of rotation is parallel with the z-axis of the coordinate system 290. The axial magnetic bearing comprises equipment for generating a position signal $P_z$ indicative of the axial position of the rotor assembly. In the exemplifying case illustrated in FIG. 2, the equipment for generating the position signal $P_z$ comprises a sensor 212 and a circuitry 219 for generating the position signal on the basis of the output signal of the sensor. The sensor 212 can be, for example but not necessarily, an inductive sensor where the inductance is dependent on the distance from the sensor 212 to a conical surface of the shaft portion, and the circuitry 219 can be configured to form the position signal $P_z$ on the basis of the inductance. The equipment for generating the position signal $P_z$ comprises advantageously also another sensor facing towards another conical surface of the shaft portion, where the other conical surface tapers in the negative z-direction. In this case, the circuitry 219 can be configured to form the position signal $P_z$ on the basis of the difference between the inductances of the sensors. The other sensor and the other conical surface of the shaft portion are not shown in FIG. 2.

The exemplifying and non-limiting axial magnetic bearing illustrated in FIG. 2 comprises electromagnets 213 and 214 for directing mutually opposite axial forces to the disc 202. In FIG. 2, the electromagnets 213 and 214 are shows as section views where the section plane is parallel with the xz-plane of the coordinate system 290. Exemplifying flux lines of the magnetic fluxes generated by the electromagnets are depicted with dashed lines in FIG. 2. The axial magnetic bearing comprises a controller 215 for receiving the position signal $P_z$ and for controlling electrical currents of the electromagnets 213 and 214 on the basis of a deviation of the axial position of the rotor assembly from the reference axial position. The controller 215 comprises a control section 216 and controllable output stages 217 and 218 for supplying electrical currents to the windings of the electromagnets. The control section 216 is configured to control the output stages 217 and 218 so that the position signal $P_z$ is driven to the reference value of the position signal. The control section 216 can be implemented with one or more analogue circuits and/or with one or more digital processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

The specific examples provided in the description given above should not be construed as limiting the scope and/or the applicability of the appended claims. Lists and groups of examples provided in the description given above are not exhaustive unless otherwise explicitly stated.

What is claimed is:

1. A rotor assembly comprising:
a shaft portion; and
a disc attached to the shaft portion and suitable for operating as a part of an axial magnetic bearing, the disc comprising an aperture for the shaft portion, wherein:
the disc comprises a conical surface on a portion reaching radially from the aperture of the disc a distance away from the aperture of the disc,
the rotor assembly further comprises a fastening mechanism comprising an aperture for the shaft portion so that the fastening mechanism comprises a conical surface matching the conical surface of the disc and being free from mechanical contacts with the shaft portion, and
the fastening mechanism and the shaft portion are shaped to enable the fastening mechanism to be tightened axially against the conical surface of the disc so as to arrange the conical surface of the fastening mechanism to press the conical surface of the disc towards a center line of the shaft portion, the fastening mechanism directing axial force to the shaft when being tightened axially against the conical surface of the disc.

2. The rotor assembly according to claim 1, wherein the conical surface of the disc is a first one of two conical surfaces of the disc on opposite sides of the disc, and the shaft portion is shaped to comprise a conical surface matching a second one of the conical surfaces of the disc and pressing the second one of the conical surfaces of the disc towards the center line of the shaft portion when the fastening mechanism is tightened axially against the first one of the conical surfaces of the disc.

3. The rotor assembly according to claim 1, wherein the fastening mechanism comprises a first element having the conical surface of the fastening mechanism and a second element for tightening the first element axially against the conical surface of the disc, the second element having threads matching corresponding threads of the shaft portion.

4. The rotor assembly according to claim 3, wherein the fastening mechanism further comprises a washer-plate between the first and second elements.

5. The rotor assembly according to claim 1, wherein the disc is made of steel.

6. An axial magnetic bearing comprising:
a rotor assembly;
equipment for generating a position signal indicative of an axial position of the rotor assembly;
at least one electromagnet for directing an axial force to a disc of the rotor assembly; and
a controller for receiving the position signal and for controlling electrical current of the electromagnet on the basis of a deviation of the axial position of the rotor assembly from a reference axial position,
wherein:
the disc of the rotor assembly comprises an aperture for a shaft portion of the rotor assembly and the disc of the rotor assembly is attached to the shaft portion of the rotor assembly,
the disc is suitable for operating as a part of the axial magnetic bearing,
the disc comprises a conical surface on a portion reaching radially from the aperture of the disc a distance away from the aperture of the disc,
the rotor assembly further comprises a fastening mechanism comprising an aperture for the shaft portion so that the fastening mechanism comprises a conical surface matching the conical surface of the disc and being free from mechanical contacts with the shaft portion, and
the fastening mechanism and the shaft portion are shaped to enable the fastening mechanism to be tightened axially against the conical surface of the disc so as to arrange the conical surface of the fastening mechanism to press the conical surface of the disc towards a center line of the shaft portion, the fastening mechanism directing axial force to the shaft when being tightened axially against the conical surface of the disc.

7. The axial magnetic bearing according to claim 6, wherein the axial magnetic bearing comprises another electromagnet for directing another axial force to the disc of the rotor assembly and the controller is configured to control electrical current of the other electromagnet on the basis of the deviation of the axial position of the rotor assembly from the reference axial position, the axial forces directed by the electromagnets to the disc of the rotor assembly being opposite to each other.

8. The axial magnetic bearing according to claim 6, wherein the axial magnetic bearing comprises a permanent magnet for directing another axial force to the disc of the rotor assembly, the axial force directed to the disc of the rotor assembly by the permanent magnet being opposite to the axial force directed to the disc of the rotor assembly by the electromagnet.

9. The rotor assembly according to claim 2, wherein the fastening mechanism comprises a first element having the conical surface of the fastening mechanism and a second element for tightening the first element axially against the conical surface of the disc, the second element having threads matching corresponding threads of the shaft portion.

10. The rotor assembly according to claim 9, wherein the fastening mechanism further comprises a washer-plate between the first and second elements.

11. The rotor assembly according to claim 2, wherein the disc is made of steel.

* * * * *